(12) United States Patent
Ito et al.

(10) Patent No.: US 6,819,058 B2
(45) Date of Patent: Nov. 16, 2004

(54) DISCHARGE-LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 24 days.

(21) Appl. No.: 10/386,774

(22) Filed: Mar. 12, 2003

(65) Prior Publication Data

US 2004/0004442 A1 Jan. 8, 2004

(30) Foreign Application Priority Data

Mar. 13, 2002 (JP) ..................................... P.2002-067937

(51) Int. Cl.[7] .............................................. H05B 37/00
(52) U.S. Cl. ................... 315/219; 315/224; 315/DIG. 7
(58) Field of Search ............................... 315/224, 225, 315/219, DIG. 5, DIG. 7

(56) References Cited

U.S. PATENT DOCUMENTS

| | | | |
|---|---|---|---|
| 5,705,898 A | 1/1998 | Yamashita et al. | 315/308 |
| 5,929,573 A * | 7/1999 | Louwers et al. | 315/219 |
| 6,204,609 B1 * | 3/2001 | Kimball | 315/169.3 |
| 6,525,489 B2 * | 2/2003 | Rudolph | 315/225 |

* cited by examiner

Primary Examiner—David Vu
(74) Attorney, Agent, or Firm—Fish & Richardson P.C.

(57) ABSTRACT

A discharge-lamp lighting circuit designed to decrease the size of a driving circuit for driving switching elements constituting a DC-AC converter circuit 4 therein and to reduce the manufacturing cost likewise. With a bridge type circuit arrangement having a plurality of switching elements SW1 to SW4 in the DC-AC converter circuit 4, a plurality of bipolar transistors are used to form a driving circuit for controlling the on-off conditions of the elements SW1 and SW3 positioned on the high voltage side out of the switching elements. At this time, a plurality of transistors (22 and 23) are connected in series and the on-off conditions of the switching element SW1 are controlled by the transistor 23 on the low voltage side. Moreover, there is provided a resistance element 26 so as to limit current flowing from the node α between the switching elements forming the arms of the bridge to the transistor. Switching speed of the proper transistor 23 is also improved by controlling the base current flowing into the transistor.

4 Claims, 6 Drawing Sheets

DISCHARGE-LAMP LIGHTING CIRCUIT

BACKGROUND OF THE INVENTION

1. Field of the Invention

The present invention relates to a DC-AC converter circuit for use in a discharge-lamp lighting circuit, which is made small in size and low in manufacturing cost.

2. Description of the Related Art

There is a known arrangement of component parts including a DC-DC converter circuit, a DC-AC converter circuit and a starter circuit to constitute a discharge-lamp lighting circuit such as a circuit for lighting a metal halide lamp and so forth.

The DC-AC converter circuit positioned at the rear stage of the DC-DC converter circuit is used for supplying the AC voltage converted from the DC input voltage to a discharge lamp and has a bridge type circuit using a plurality of semiconductor switching elements and a driving circuit. More specifically, the driving circuit made of a driving IC (Integrated Circuit) supplies control signals to the respective semiconductor switching elements. Alternating operation of the bridge circuit is performed by the control signals that define the on-off conditions of the switching elements, so that the direct current is converted to the alternating current.

In a typical conventional circuit of the sort mentioned above, there are develop cost and packaging-area problems when the driving IC is used as the driving circuit for the switching elements forming the bridge circuit. In other words, the use of an expensive driving IC causes an increase in the whole circuit cost and moreover the packaging area of such a driving IC constitutes an obstacle to reducing its size.

Although there may be considered a method of attempting to reduce the cost by assembling a circuit having the same function as that of the driving IC from discrete parts, there are problems with the conventional arrangement in view of protecting the withstand voltage of the element and increasing the switching speed as follows.

To drive the switching element, it may increase the cost further due to the necessity of using a high-withstand-voltage semiconductor element instead. The use of a high with stand voltage (approximately at 600V) element is needed in case where a FET (Field Effect Transistor) is employed, for example, as a single control element for controlling the on-off conditions of the switching element positioned on the high voltage side out of the arms constituting the bridge circuit. Otherwise, measures are needed to be taken to protect the element from being injured or damaged by a large current flowing from the bridge into the semiconductor element. The cost will also increases by taking such measures.

In case where the switching speed of the semiconductor element for driving the switching element is low, there is the possibility of impeding the operation of the bridge and this results in the necessity of using a high-speed element, which causes an increase in the cost.

SUMMARY OF THE INVENTION

An object of the invention is to provide a discharge-lamp lighting circuit in which a circuit for driving a switching element forming a DC-AC converter circuit is reduced in not only size but also cost.

A discharge-lamp lighting circuit comprising a DC-DC converter circuit for converting input voltage from a DC power supply to a desired DC voltage and a DC-AC converter circuit which is positioned at the rear stage of the DC-DC converter circuit and used for converting the DC voltage to AC voltage according to the invention is constituted of the following.

First, the DC-AC converter circuit is formed in accordance with a bridge type circuit arrangement including a plurality of switching elements and is provided with a driving circuit using a plurality of bipolar transistors for controlling the on-off conditions of the switching elements positioned on the high voltage side out of the switching elements forming a bridge; and the plurality of bipolar transistors are connected in series and the on-off conditions of the switching elements are controlled by the transistors positioned on the low voltage side, so that the withstand voltage of each transistor is lowered.

The bipolar transistors for controlling the on-off conditions of the switching element positioned on the high voltage side out of the switching elements forming the bridge are employed and the resistance element for limiting the current flowing through the bipolar transistor from the node between the switching elements forming the arms of the bridge is connected to the proper bipolar transistor, whereby the resistance element is prevented from being damaged by a large current.

A control circuit for controlling the condition of the bipolar transistors so that the base current flowing through the proper transistor before the transistor is turned off after the transistor is turned on once is made smaller than the base current flowing through the transistor when the transistor is turned on, whereby the switching speed of the transistor is improved (which makes it unnecessary to use any high-speed transistor).

It is therefore made possible to lower withstand voltages of transistors, to protect elements by current limiting resistance elements and to increase switching speed, whereby a switching element forming a DC-AC converter circuit is reduced in not only size but also cost.

DESCRIPTION OF THE PREFERRED EMBODIMENT

Figure 1:
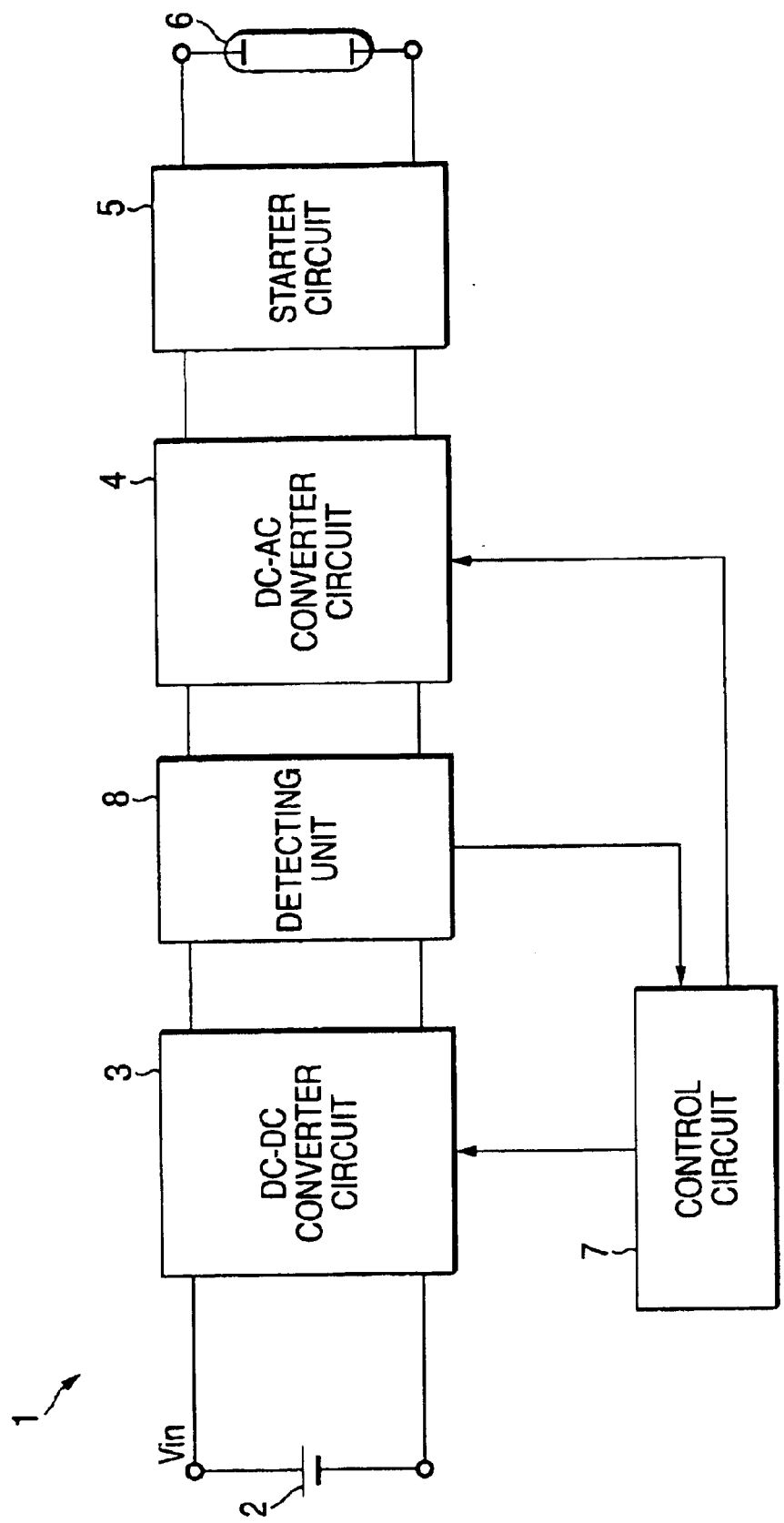
FIG. 1 is an exemplary basic block diagram of a discharge-lamp lighting circuit embodying the invention.

FIG. 1 is a basic block diagram of a lighting circuit embodying the invention, wherein a discharge-lamp lighting circuit 1 comprises a DC power supply 2, a DC-DC converter circuit 3, a DC-AC converter circuit 4, a starter circuit 5 and a control circuit 7.

On receiving DC input voltage (hereinafter called the Vin) from the DC power supply 2, the DC-DC converter circuit 3 operates to convert the DC input voltage to a desired DC voltage and a fly-back DC-DC converter or the like is employed in this case.

The DC-AC converter circuit 4 is use for converting the output voltage of the DC-DC converter circuit 3 to AC voltage and then supplying the AC voltage to a discharge lamp 6 via the starter circuit 5. In a full-bridge circuit, for example, four semiconductor switching elements are used to constitute two arms and a driving circuit for driving the switching elements of the respective arms separately is provided so as to output the AC voltage by performing the on-off control of the two sets of switching elements reciprocally. In a half-bridge circuit, moreover, a driving circuit for driving arms using two semiconductor switching elements is provided so as to perform the on-off control of the switching elements alternately. In any way, there is formed a driving circuit using bipolar transistors as semiconductor elements for controlling the on-off conditions of switching elements positioned on the high voltage side out of the switching elements constituting a bridge according to the invention.

The starter circuit (so-called a starter) 5 is provided in order to start the discharge lamp 6 by causing a high voltage pulse signal (starting pulse) for starting the discharge lamp 6 to be generated and the signal is superposed on the AC voltage supplied by the DC-AC converter circuit 4 before being applied to the discharge lamp 6.

On receiving the voltage applied to the discharge lamp 6 and current flowing into the discharge lamp or a detection signal relating to the equivalent voltage and current, the control circuit 7 controls electric power to be fed into the discharge lamp 6 and also the output of the DC-Dc converter circuit 3. In other words, the control circuit 7 is provided in order to control the power supplied according to the condition of the discharge lamp 6. On receiving a detection signal from a detecting unit 8 for detecting the output voltage and the output current of the DC-DC converter circuit 3, for example, the control circuit 7 controls the output voltage by sending out a control signal to the DC-DC converter circuit 3. In addition, the control circuit 7 controls the DC-AC converter circuit 4 by sending out a control signal thereto. It is also the role of the control circuit 7 to perform output control to ensure that the discharge lamp is lighted by raising the level of the voltage supplied to the discharge lamp to a certain degree before the discharge lamp is lighted. As a power control system, there are known systems such as a PWM (Pulse Width Modulation) system and a PFM (Pulse Frequency Modulation) system, for example.

Figure 2:
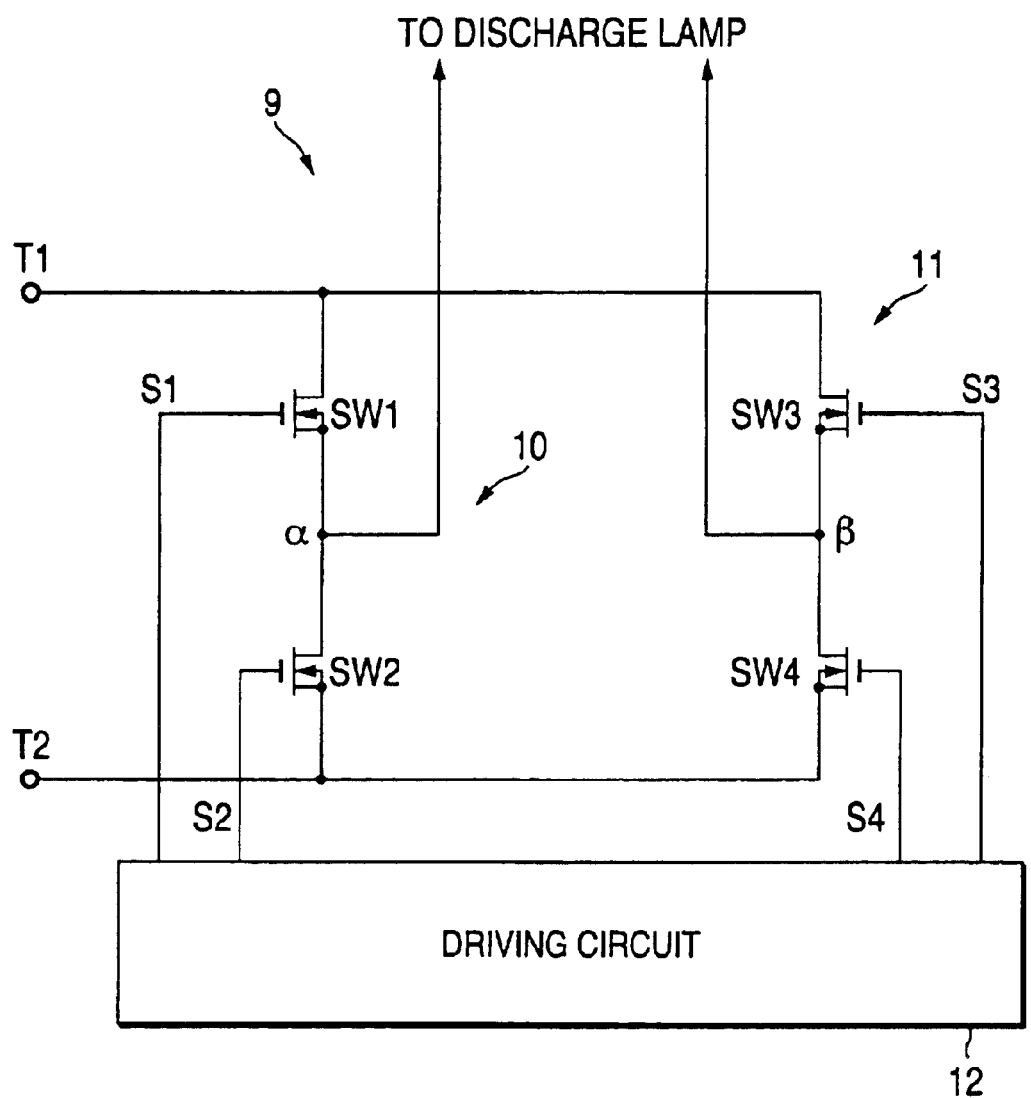
FIG. 2 is an exemplary diagram of a DC-AC converter circuit.

FIG. 2 is an exemplary block diagram of a full-bridge circuit 9 and this example employs a full-bridge type arrangement using four semiconductor switching elements SW1 to SW4.

An N-channel MOS FET is used as each of the switching elements and the switching elements SW1 and SW2 constitute an arm (left arm) 10, whereas the switching elements SW3 and SW4 constitute another arm (right arm) 11, these arms being provided in parallel.

In the left arm 10, the switching elements SW1 and SW2 are connected in series and the drain of the FET forming the switching element SW1 is connected to an input terminal T1. On the other hand, the source of the FET forming the switching element SW2 is connected to an input terminal T2. Further, a point a indicates a node where the switching elements SW1 and SW2 join.

In the right arm 11, the switching elements SW1 and SW2 are connected in series and the drain of the FET forming the switching element SW3 is connected to the input terminal T1. The source of the FET forming the switching element SW4 is then connected to the input terminal T2. Further, a point α indicates a node where the switching elements SW3 and SW4 join.

The outputs taken out of these nodes α and β are supplied to the discharge lamp and when this arrangement is applied to one discharge lamp, for example, one of the electrodes of the discharge lamp is connected via the node α to the starter circuit (with an inductive element), whereas the other electrode thereof is connected to the node β.

The driving circuit 12 regulates the polarity of the bridge by sending out one of the control signals S1 to S4 to the respective switching elements SW1 to SW4. More specifically, the driving circuit 12 operates to drive the switching elements by sending out the control signals S1 to S4 to the FETs forming the respective elements SW1 to SW4 so as to control their on-off conditions. Assuming that each of the elements is so controlled that the switching element SW1 is turned on and the switching element SW2 is turned off at a certain time, the switching element SW3 is turned off and the switching element SW4 is turned on then. Moreover, assuming that the each of the elements is so controlled that the switching element SW1 is turned off and the switching element SW2 is turned on at another time, the switching element SW3 is turned on and the switching element SW4 is turned off then. Thus, the switching elements SW1 and SW4 are in the same condition, whereas the switching elements SW2 and SW3 are in the same condition, whereby these switching elements operate alternately.

Figure 3:
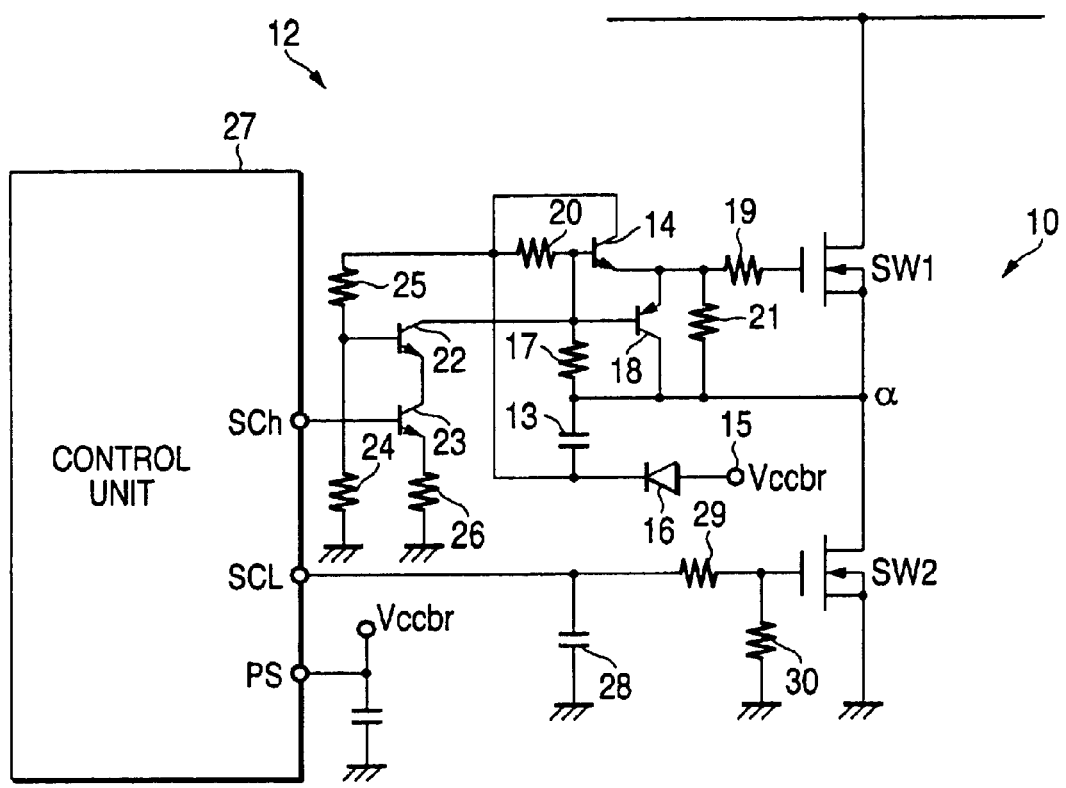
FIG. 3 is an exemplary diagram of the principal part of a driving circuit.

FIG. 3 is an exemplary block diagram of the driving circuit 12, wherein a circuit portion relating to one of the arms (which is the left arm 10 of FIG. 2) is shown. In other words, the other arm is the same in make-up as one arm and the description of the other arm will be omitted to avoid the repetition of the description thereof (as it is only needed to read the following description properly by replacing the switching element SW1 with the switching element SW3, the switching element SW2 with the switching element SW4 and the node α with the node β).

Of the switching elements SW1 and SW2 for use in forming the arm 10, a SW1 driving portion positioned on the high voltage side will be described first. A plurality of bipolar transistors are employed for the switching element SW1 in order to control the on-off conditions of the switching element and a charging pump type arrangement is adopted according to this embodiment of the invention. More specifically, by supplying electric charge to the gate of the FET (SW1) via an NPN transistor 14, the FET is turned on.

Voltage generated by a control unit (hereinafter called the Vccbr), which will be described later, is supplied to a power supply terminal 15, which is in turn connected via a diode 16 to a capacitor 13. In this case, the Vccbr is the voltage great enough to drive the switching elements SW1 and SW2 and, for example, generated by the use of a voltage multiply circuit (not shown) for obtaining voltage integer times as great as a predetermined reference voltage.

One end of the capacitor 13 is connected to the node α between the switching elements SW1 and SW2 and also connected via a resister 17 to the base of the NPN transistor 14 and the base of a PNP transistor 18.

The emitter of the transistor 14 is connected via a resistor 19 to the control terminal (gate of the FET) of the switching element SW1 and also connected to the emitter of the PNP transistor 18. The collector of the transistor 18 is connected to the node α. A resistor 20 is provided to the base of the NPN transistor 14 and the node between this resistor and the collector of the transistor 14 is connected to the cathode of the diode 16.

One end of a resistor 21 is connected to the emitters of the transistors 14 and 18 and the other end of the resistor is connected to the node α.

With respect to two NPN transistors 22 and 23 connected in series, the transistor 22 is positioned on the high voltage side and the collector of the transistor 22 is connected to the base of the transistor 14 and the base of the transistor 18. The emitter of the transistor 22 is then connected to the collector of the transistor 23 and the base of the transistor 22 is grounded via a resistor 24 and connected via a resistor 25 to the resistor 20.

The emitter of the transistor 23 is grounded via a resistor 26 and a signal from a control unit 27 is supplied to the base of the transistor 23.

The control unit 27 is formed as an integrated circuit (whose internal circuit will be described later) and provided with control output terminals SCh and SCL and the power supply terminal PS of the Vccbr, the control output terminal SCh is connected to the base of the transistor 23.

According to this embodiment of the invention, by supplying electric charge to the gate of the FET (SW1) via the NPN transistor 14, the FET is turned on (at this time, the transistors 22 and 23 are held OFF because of the signal sent by the control unit 27). In order to turn off the FET, a sink (current extraction) with respect to the base current of the PNP transistor 18, that is, the electric charge is extracted from the gate of the FET by turning on the transistors 22 and 23 so as to hold ON the transistor 18. Thus, the presence or absence of the sink with respect to the base current of the transistor 18 is controlled by the control unit 27 via the transistors 22 and 23; Regarding the withstand voltages of the transistors 22 and 23, they are to share the maximum output voltage (open-circuit voltage) of the lighting circuit half-and-half, so that the voltages are halved in comparison with the use of one semiconductor element. In case where withstanding a maximum of 400V is required, for example, it is only necessary for the withstand voltage of each transistor to be set at a value exceeding 200V. In other words, by connecting the plurality of bipolar transistors in series and making the transistor positioned on the low voltage side control the on-off condition of the switching element, the withstand voltage required can be shared among the transistors.

The resistor 26 connected to the transistor 23 is provided so as to limit the current flowing through the bipolar transistors (18, 22 and 23) from the node (α in this embodiment) between the switching elements forming the bridge arms. More specifically, the resistor 26 is used for limiting the current flowing through a path from α as the midpoint between the bridge arms→the collector of the PNP transistor 18→the base of the PNP transistor 18→the NPN transistors 22 and 23→the emitter of the transistor 23→the resistor 26→GND (ground) to the FET (SW2). In other words, a relatively large voltage (approximately hundreds of volts) is applied to the node α and as this voltage is allowed to have a certain quantity of energy due to the capacitance component of the FET, a capacitor for dealing with noise (to be connected between the node α and GND, though not shown) and so forth, the absence of the resistor 26 may result in causing the bipolar transistors to be damaged in case where a large current flows because of energy radiation. Consequently, the current value is limited by connecting the resistor 26 to the proper bipolar transistor (the resistor 26 is connected between the emitter of the bipolar transistor 23 and the ground in this embodiment). When the resistance value of the resistor 26 (this is called R26) is set at approximately 1 kΩ so as to limit the high-level output voltage of the control unit 27 as will be described later, the base current of the PNP transistor 18 can be limited to 1 milliampere or smaller. Assuming that the value of the h parameter hfe of the proper transistor is approximately 100, the maximum current at the time the gate charge of the FET (SW1) is extracted comes to several tens of milliamperes (the current value may be made greater by making the R26 smaller but if the set value of the R26 is made too small, the NPN transistor 23 tends to become turned off slowly, which is not preferred, and therefore the value of the R26 should be determined by taking the switching speed into consideration). The method of limiting the collector current of the transistor by the use of the resistance element like this is effective irrespective of the number of switching-element driving transistors and almost no cost will be incurred.

The switching element SW2 on the low voltage side is driven by a signal supplied from the control output terminal SCL of the control unit 27 and the terminal is connected via a capacitor 28 and a resistor 29 to the gate of the FET (SW2). One end of the capacitor 28 that is provided for surge protection is connected to the control output terminal SCL and the other end of the capacitor is grounded. Further, one end of a resistor 30 is connected to the gate of the FET (SW2) and the other end of the resistor is grounded. Like the switching element SW2, the capacitor 28 and the resistor 30 are grounded as the bridge type circuit is grounded.

Obviously, the on-off condition of the FET as the SW2 is directly controlled by the signal from the control output terminal SCL and the circuit arrangement in this case is simple.

Figure 4:
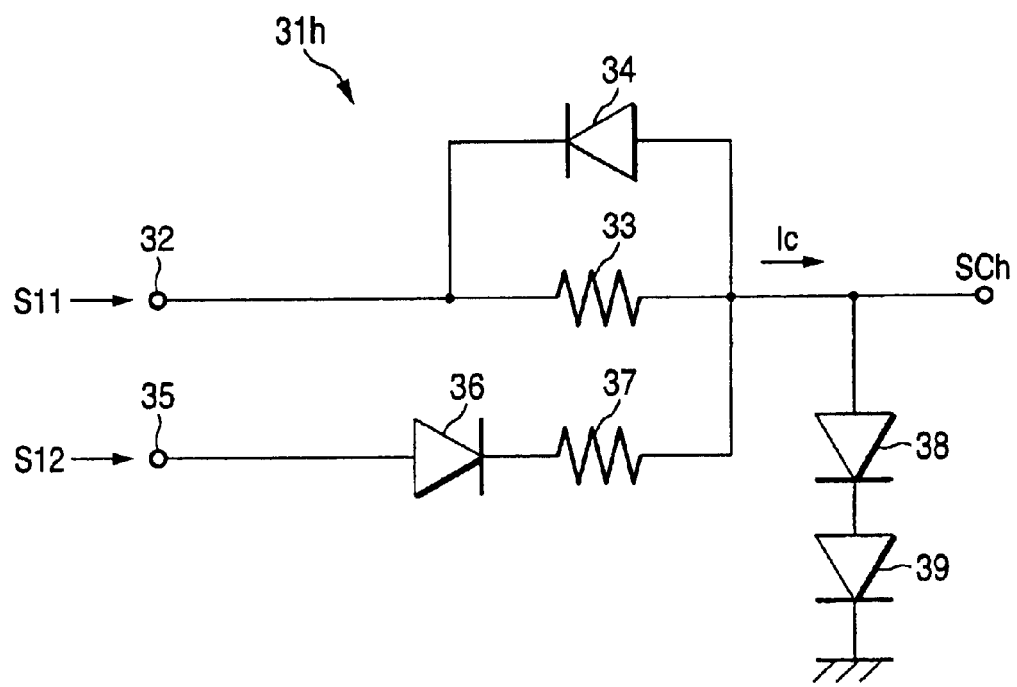
FIG. 4 is, together with FIGS. 5 and 6, a circuit diagram explanatory of a control circuit for controlling bipolar transistors for driving switching elements on the high voltage side.
Figure 6:
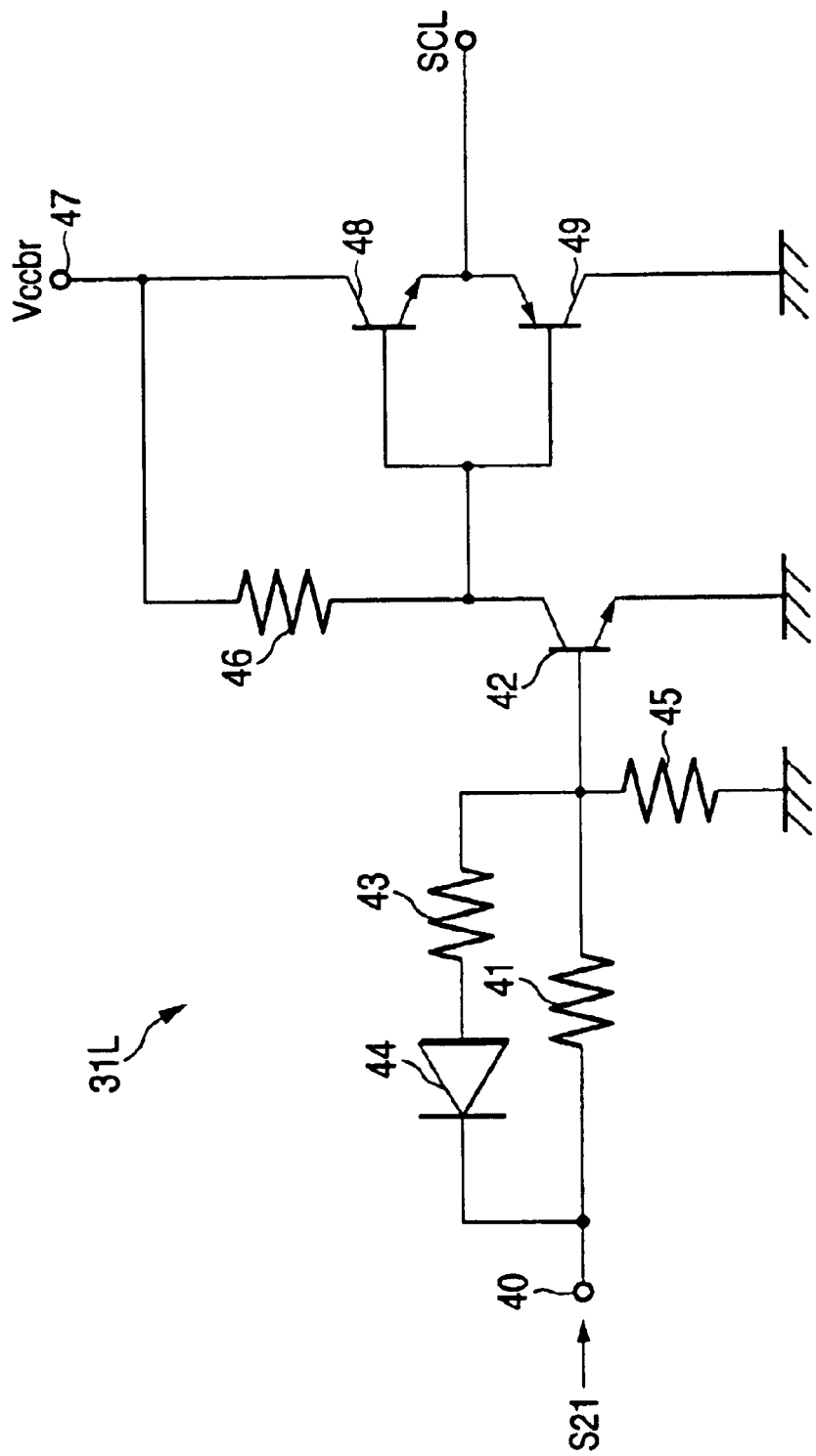
FIG. 6 is a circuit diagram showing an arrangement of a control circuit concerning the driving of a switching element on the low voltage side.

FIGS. 4 and 6 show arrangements of the internal circuit of the control unit 27: FIG. 4 refers to an arrangement of a control circuit 31h concerned with the control output terminal SCh and FIG. 6 to an arrangement of a control circuit 31L concerned with the control output terminal SCL.

In FIG. 4, a clock signal S11 from a signal generating unit (not shown) is supplied to a terminal 32 and one end of a resistor 33 is connected to the terminal 32, the other end of the resistor being connected to the control output terminal SCh.

A diode 34 is provided in parallel to the resistor 33 and the cathode of the diode is connected to the terminal 32, the anode of the diode being connected to the control output terminal SCh.

A signal S12 from the signal generating unit (not shown) is supplied to a terminal 35, which is connected via a diode 36 and a resistor 37 to the control output terminal SCh. More specifically, the anode of the diode 36 is connected to the terminal 35 and the cathode of the diode 36 is connected via the resistor 37 to the control output terminal SCh.

Two diodes 38 and 39 are connected in series at the output stage and the anode of one diode 28 is connected to the control output terminal SCh. The cathode of the diode 38 is connected to the anode of the diode 39 and the cathode of the diode 39 is grounded. This arrangement is intended to limit the collector current of the transistor 23 connected to the control output terminal SCh by limiting VOH (i.e., limiting a high-level output voltage to 2·Vf (where Vf=forward voltage drop). When the base-to-emitter voltage of the transistor 23 is written as VBE, the transistor is turned on so that its emitter voltage comes to 2·Vf−VBE and the result is limited by the resistor 26 (e.g., when Vf=VBE, the emitter voltage comes to Vf and the collector current is limited to Vf/R26 by the resistor 26).

Figure 5:
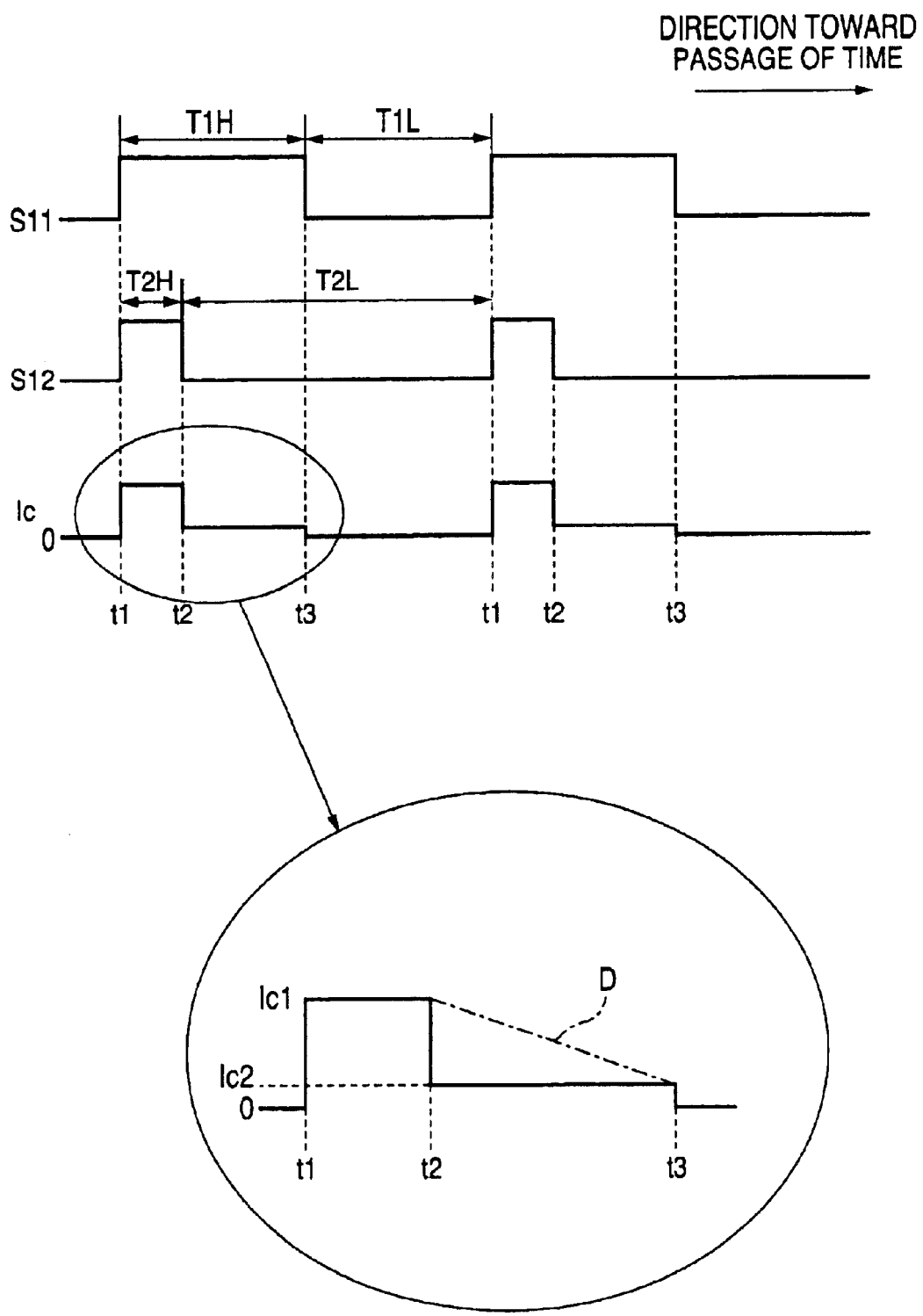
FIG. 5 is a timing chart explanatory of the circuit operation of FIG. 4.

FIG. 5 is a schematic waveform chart showing the waveforms of the signals S11 and S12 and the waveform of the control current (directed to the base of the transistor 23) shown by Ic in FIG. 4. The signs below mean the following:

t1=a point of time when S11, S12 and Ic rise;

t2=a point of time when S12 falls and when Ic falls to a very small current;

t3=a point of time when S11 falls and when Ic falls to zero ampere;

T1H=high-level duration of S11;

T1L=low-level duration of S11;

T2H=high-level duration of S12; and

T2L=low-level duration of S12.

Further, the signal S11 according to this embodiment of the invention is a signal in a rectangular waveform having a duty cycle of 50% and the duty cycle of the signal S12 is smaller than that of the signal S1. The waveform of Ic is such that it rises at the point of time t1 and after showing a value Ic1, it falls at the point of time t2, showing a very small current value Ic2 (in FIG. 5, an enlarged segment of the waveform of Ic is shown within a large circular frame). Then the value of Ic falls to zero ampere at the point of time t3.

As it has generally been known that high-withstand-voltage transistors are slow at switching speed, particularly when they are turned off, an attempt has been made to improve such switching speed by controlling the base current of the transistor in accordance with the following items:

(I) the base current is increased so as to increase the speed at the time of turning off; and (II) the base current is decreased so as to increase the speed at the time of turning off.

Although (I) and (II) appear to conflict with each other at first sight, no problem is posed when (I) and (II) are applied differently in duration with a time base; namely, (I) may be applied while the transistor is held ON and (II) may be applied before the transistor is turned off after it is turned on. In other words, control is performed so that the base current caused to flow before or immediately before the bipolar transistor is turned off after it is turned on once is set smaller than the base current caused to flow when the transistor is turned on.

In order to increase speed in turning on the transistor, it is only needed to increase the current supplied to the base of the transistor; however, this results in slowing the turning-off of the transistor, whereby the base current immediately before the turning-off of the transistor is preferably smaller. The base current can be made smaller by letting a small quantity of collector current flow into the transistors 22 and 23 by the use of the signal from the control unit 27 to maintain the on state of the FET as the switching element SW1. Therefore, the bipolar transistors for controlling the condition of the switching element on the high voltage side are such that a comparatively large current is supplied when the proper transistor is turned on and the transistor switching speed can be made increasable by performing control to decrease the proper base current immediately before the transistor is turned off.

As shown in FIG. 5, though the clock signals S11 and S12 rise in synchronization with each other, the signal S12 rises earlier in terms of time. With respect to the resistance values of the resistors 33 and 37 shown in FIG. 4, that of the resistor 33 is set greater. As the signal S11 is supplied via the resistor 33 and as the signal S12 is supplied via the resistor 37, the current value of the current Ic comes to Ic1, which is a great value, for the duration of T2H and comes to Ic2, which is a small value, for the duration of T2L. Then the value of Ic for the duration of T1L falls to zero.

According to this embodiment of the invention, the current is supplied via the resistors 33 and 37 at the instant the transistor is initially turned on and then (at the point of time t2) the current value varies with time over the two stages of Ic1 and Ic2 by suspending the supply of the current from the resistor 37 and allowing only the source current to flow via the resistor 33. Moreover, there may be employed a form of changing the value of multistage Ic stepwise; for example, the Ic value may be decreased with the passage of time over a multistage of three or greater by installing more series circuits with diodes and resistors in order to increase the number of stages by increasing the number of clock signals. In addition, there may otherwise be employed a form of control so that the current value is continuously decreased from Ic1 to Ic2 as shown by a chain double-dashed line D in the large circular frame of FIG. 5 by adding a circuit for extracting the base current after t2 by the use of transistors and analog switches; for example, though use can be made of a form of decreasing the Ic value linearly or curvedly with the passage of time (regardless of the transition process from Ic to Ic2), the two-stage control above is preferable in view of preventing the circuit arrangement from becoming complicated.

Thus, the method of controlling the base current of the bipolar transistor is effective irrespective of the number of transistors for driving the switching elements.

In a control circuit 31L of FIG. 6, a signal S21 from a signal generating unit (not shown) is supplied to a terminal 40 and connected via a resistor 41 to the base of an NPN transistor 42.

A circuit formed with a resistor 43 and a diode 44 is connected to the resistor 41 in parallel and the cathode of the diode 44 is connected to the terminal 40. The anode of the diode 44 is connected via the resistor 43 to the base of the NPN transistor 42. Further, one end of a resistor 45 is connected to the base of the transistor 42, the other end being grounded.

The collector of the transistor 42 with the emitter grounded is connected via a resistor 46 to a power supply terminal 47 as Vccbr and also connected to the base of an NPN transistor 48 and the base of a PNP transistor 49.

The NPN transistor 48 and the PNP transistor 49 form a complimentary pair and the collector of the NPN transistor 48 is connected to the power supply terminal 47. The emitter of the transistor 48 is connected to the emitter of the transistor 49 and to the control output terminal SCL. The collector of the transistor 49 is grounded.

Therefore, the on-off condition of the NPN transistor 42 is controlled according to the (H or L) level of the signal S3 in the circuit above and the Vccbr is outputted when the NPN transistor 48 is turned on.

Although the description above has been based on the assumption that no dead time is provided for the driving of the switching elements SW1 TO SW4 for the sake of convenience, a predetermined time (approximately hundreds of nanoseconds) has actually been set by control logic.

With the arrangement above, it is possible to reduce a packaging area by the use of a plurality of bipolar transistors to form a driving circuit for driving switching elements that form a bridge (this actually resulting in reducing the packaging area by about 15% in comparison with a case where two of the half-bridge driving ICs for each driving the arms are mounted.

The provision of the plurality of bipolar transistors connected in series is also advantageous costwise because the withstand voltage of each transistor can be lowered and moreover the cost can also be decreased by integrating the control circuit shown in FIG. 4 or FIG. 6 into an IC.

As set forth above, according to the invention, the discharge-lamp lighting circuit can be made smaller by forming the driving circuit for driving the switching elements with the plurality of bipolar transistors. As the withstand voltage of each bipolar transistor can be lowered by connecting these transistors in series, any high-withstand-voltage transistor is not needed, whereby the cost can be reduced.

Further, according to the invention, current flowing into the bipolar transistor can be limited only by providing the resistance element, whereby the circuit arrangement is simplified with the minimum cost.

Further, according to the invention, switching speed of the bipolar transistor can be improved by controlling the base current. Particularly, it is effectively to improve the turn-off speed of the transistor.

What is claimed is:

1. A discharge-lamp lighting circuit comprising:
   a DC-DC converter circuit for converting input voltage from a DC power supply to a desired DC voltage; and
   a DC-AC converter circuit which is positioned at the rear stage of the DC-DC converter circuit and used for converting the DC voltage to AC voltage, the DC-AC converter circuit formed in accordance with a bridge type circuit arrangement including a plurality of switching elements,
   wherein the DC-AC converter includes a driving circuit using a plurality of bipolar transistors for controlling the on-off conditions of the switching elements positioned on the high voltage side of the switching elements forming a bridge; and
   the plurality of bipolar transistors are connected in series and the on-off conditions of the switching elements are controlled by the transistors positioned on the low voltage side.

2. A discharge-lamp lighting circuit as claimed in claim 1, further comprising:
   a control circuit for controlling the condition of the bipolar transistors so that the base current flowing through the transistor before the transistor is turned off after the transistor is turned on once is made smaller than the base current flowing through the transistor when the transistor is turned on.

3. A discharge-lamp lighting circuit comprising:
   a DC-DC converter circuit for converting input voltage from a DC power supply to a desired DC voltage; and
   a DC-AC converter circuit which is positioned at the rear stage of the DC-DC converter circuit and used for converting the DC voltage to AC voltage, the DC-AC converter circuit formed in accordance with a bridge type circuit arrangement including a plurality of switching elements,
   wherein the DC-AC converter includes a driving circuit using a plurality of bipolar transistors for controlling the on-off conditions of the switching elements positioned on the high voltage side of the switching elements forming a bridge; and
   is a resistance element for limiting current which flows through the bipolar transistor from the node between the switching elements forming bridge arms is connected to the proper bipolar transistor.

4. A discharge-lamp lighting circuit as claimed in claim 1, further comprising:
   a control circuit for controlling the condition of the bipolar transistors so that the base current flowing through the transistor before the transistor is turned off after the transistor is turned on once is made smaller than the base current flowing through the transistor when the transistor is turned on.

* * * * *